United States Patent [19]
Field

[11] Patent Number: 4,706,405
[45] Date of Patent: Nov. 17, 1987

[54] FISH LURE

[76] Inventor: Douglas Field, P.O. Box 3005, Courtenay, British Columbia, Canada, V9N 5N3

[21] Appl. No.: 738,486

[22] Filed: May 28, 1985

[30] Foreign Application Priority Data

Feb. 8, 1985 [CA] Canada .................................. 473834

[51] Int. Cl.⁴ ............................................. A01K 85/00
[52] U.S. Cl. .................... 43/42.05; 43/42.36
[58] Field of Search ............................. 43/42.05, 42.36

[56] References Cited

U.S. PATENT DOCUMENTS

| | | | |
|---|---|---|---|
| 2,528,861 | 11/1950 | Clason et al. | 43/42.05 |
| 2,609,633 | 9/1952 | Cracker | 43/42.05 |
| 2,625,767 | 1/1953 | Pokras | 43/42.05 |
| 2,734,301 | 2/1956 | Fuqua | 43/42.05 |
| 2,862,325 | 12/1958 | Magnus | 43/42.36 X |
| 2,912,783 | 11/1959 | Marks | 43/42.05 |
| 3,068,604 | 12/1962 | Nyberg | 43/42.05 |
| 3,685,191 | 8/1972 | Metzger | 43/42.05 |
| 3,820,269 | 6/1974 | Rae | 43/42.05 |
| 3,858,344 | 1/1975 | Watts | 43/42.05 |
| 3,885,339 | 5/1975 | Herkner | 43/42.05 |
| 4,164,826 | 8/1979 | Metzler et al. | 43/42.05 |
| 4,520,588 | 6/1985 | Hindermyer | 43/42.05 X |
| 4,536,987 | 8/1985 | Sanders et al. | 43/42.45 X |

FOREIGN PATENT DOCUMENTS 871432 5/1971 Canada .
1168867 6/1984 Canada .

Primary Examiner—Nicholas P. Godici
Assistant Examiner—Carmine Cuda
Attorney, Agent, or Firm—Russel S. Smart; Thomas R. Kelly; Martin P. Hoffman

[57] ABSTRACT

An elongated fishing lure which has generally flat and parallel sides through most of its length and which includes a through bore extending longitudinally through its length to accommodate a fishing line or leader freely therein.

6 Claims, 5 Drawing Figures

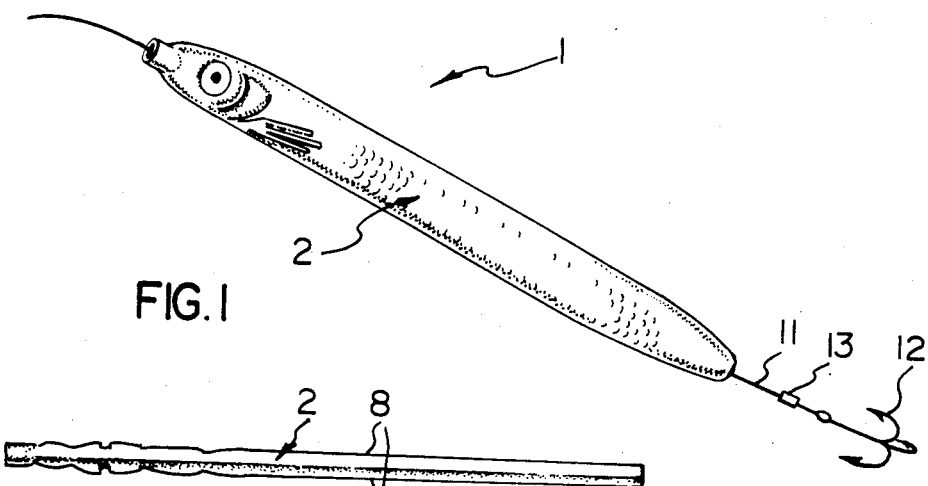
FIG. 1
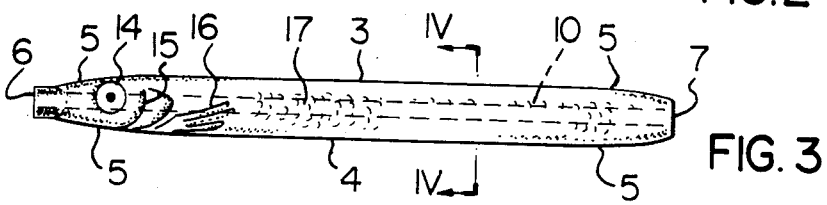
FIG. 2
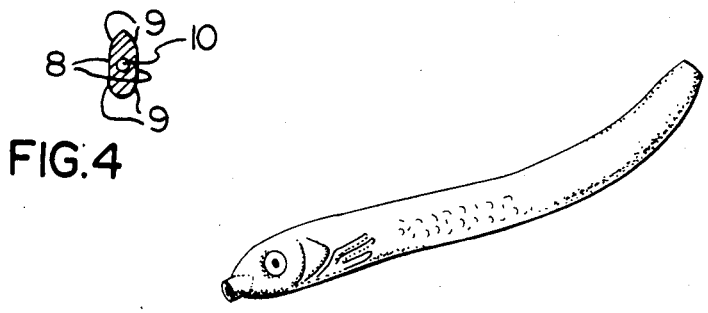
FIG. 3
FIG. 4
FIG. 5

FISH LURE

BACKGROUND OF THE INVENTION

This invention relates to a fishing apparatus, including a fishing lure.

There are many types of fishing lures available to fishermen, and they are designed with the intention of attracting and causing the fish to strike the lure. The size, shape and colouring of the lure are factors which contribute to the success of a fishing lure. In addition to this, however, the manner in which the fishing lure moves through the water is also very important to the success of the lure.

THE INVENTION

According to the present invention there is provided a fishing lure that will sink in water and to which a hook apparatus may be affixed, the length of said lure is at least five times its depth, the sides of which are generally in the same vertical plane, and the top and bottom edges of which are, in side view, generally straight or very slightly curved through most of the length of the lure and including a bore extending from a front end to the rear end, which bore is adapted to receive a fishing line or leader in such a manner as to permit the lure to slide freely along a portion of the line or leader.

It is the manner in which the fishing lure in accordance with this invention moves in the water which is surprising and greatly advantageous. The present fishing lure rotates about the central longitudinal bore as it falls in the water. After a short fall the lure then darts unexpectedly. This unexpected combinations of movements contributes to the success of this lure and occurs when the fishing line remains slack as a result of a lifting and then lowering of the fishing rod, assuming still water.

Often a fish will strike the lure and become caught by the hook as it enters the side of the mouth from the outside. The fish may expel the lure which is allowed to slide up the line or leader. As a result of the easy movement of the lure up the line, the fish does not have the advantage of prying against it in an attempt to free itself from the hook.

PREFERRED EMBODIMENTS

For the purposes of illustration, but not of limitation, the attached drawings illustrate preferred embodiments of the invention, in which:

FIG. 1 is a perspective view of the fishing lure with a hook apparatus.

FIG. 2 is a top view of the fishing lure,

FIG. 3 is a side view of the lure,

FIG. 4 is a transverse section of the lure taken along line 4—4 of FIG. 3, and

FIG. 5 is a second embodiment of the fishing lure.

Referring to the drawings, the fishing lure is represented generally by numeral 1. The lure 1 has an elongated body 2 which may be constructed of any suitable material or a combination of materials but which must be sufficiently heavy so as to sink in water. The lure may be constructed, for example, from lead or a lead alloy or from plastic together with heavier material.

The dimensions of the lure are such that its length is substantially greater than its depth (from top to bottom). The length is at least five times its depth and preferably is about nine times its depth. The depth of the lure is substantially greater than its thickness, the depth being approximately two to three times the thickness.

As can be most clearly seen in FIG. 3, the upper edge 3 is generally straight or very slightly convexly curved in side view throughout a major portion of the length of the lure. Similarly, lower edge 4 is also generally straight or very slightly convexly curved through most of its length. These upper and lower edges taper towards each other as shown at 5, at the front end 6, and the rear end 7 which can also be seen in FIG. 3. As seen in FIGS. 2, 3 and 4, at the middle part of the lure along the major portion of its length, the sides are substantially flat as shown at surfaces 8. These flat surfaces are substantially parallel to each other, the sides merging at the upper edge 3 and lower edge 4 through convexly rounded portions 9.

A through bore 10 extends longitudinally through the length of the lure, the bore being large enough so as to easily accommodate a fishing line or fishing leader 11 to which may be attached a hook 12. The size of the bore 10 permits the lure 1 to easily slide along the leader or line 11 in an uninterrupted manner. As shown in FIGS. 3 and 4, the bore may be located along the central longitudinal axis of the lure. Affixed to the line or leader 11 is a hook 12 and a rubber bumper 13. When a leader is used, it would normally be installed through the lure in order to have connecting ends already affixed to the leader, the size of which ends could not normally be accommodated in the bore 10.

The surface of the lure may be partially or fully coloured in a suitable manner. In addition to being painted, the external surfaces of the lure may be marked or profiled to add ornamentation representative of a fish, such ornamentation including on each side, for example an eye 14, gill slit 15, fin 16 and scales 17.

In a separate embodiment the lure may be curved in the horizontal plane extending through the longitudinal axis. The curve may be either a gentle curve in one direction or a gentle S-shaped curve, as shown in FIG. 5.

The front end 6 and rear end 7 of the lure, at the bore, are smooth so as to ensure that the fishing lure does not become obstructed by the line or leader and the bore is not abrasive to the line or leader.

As a result of the geometry of the lure and manner in which it is used, the lure attracts fish to strike. The fisherman should lift then lower the fishing rod so as to allow the fishing line to become slack. The lure will fall in a generally horizontal orientation and spin around the longitudinal bore. After rotating a few times, the rear or tail end tends to fall more quickly and then the lure tends to dart unexpectedly. The lure may also be used for trolling, in which case the fisherman may bend the lure to form a gentle curve or a slight S-shaped curve, the curvature and the speed of the troll determining the movement of the lure.

The lure is designed to move freely along the curve or leader when the fish strikes, as discussed above in known manner. As a result the lure may move away from the hook making it more difficult for the fish to break free.

I claim:

1. A fishing lure that will sink in water and to which a hook apparatus may be affixed, the length of said lure is at least five times its depth, said depth is about two to three times its thickness, the major portion of each of the sides are generally in the same plane, the planes being generally parallel to each other, and the top and bottom edges are, in side view, generally straight or very slightly curved through most of the length of the lure and generally symmetrical along the longitudinal central axis, said lure including a bore extending from a front end to the rear end, which bore is adapted to receive a fishing line or leader in such a manner as to permit the lure to slide freely along a portion of the line or leader.

2. A fishing lure as defined in claim 1 wherein said bore extends along the longitudinal axis of said lure.

3. A fishing lure as defined in claim 2 wherein the lure is curved in the horizontal plane extending through the said longitudinal axis.

4. A fishing lure as defined in claim 2 and a hook apparatus comprising fishing line extending through said bore from the front end to the rear end and affixed at the rear end to a hook.

5. A fishing lure as defined in claim 2 and a hook apparatus comprising a leader the length of which is at least about 50% greater than the length of the fishing lure, which leader extends through said bore from the front end to the rear end.

6. A fishing lure apparatus as defined in claim 4 including a bumper located on the line or leader at the rear end of the lure.

* * * * *